United States Patent
Zhang et al.

(10) Patent No.: US 12,537,462 B2
(45) Date of Patent: Jan. 27, 2026

(54) SINGLE-STAGE MULTI-PATH DIRECT CURRENT ACCESS CONVERTER AND CONTROL METHOD THEREOF

(71) Applicant: Sungrow Power Supply Co., Ltd., Hefei (CN)

(72) Inventors: Lu Zhang, Hefei (CN); Hao Wang, Hefei (CN); Yu Gu, Hefei (CN); Linhai Zhao, Hefei (CN); Qiaodi Chen, Hefei (CN)

(73) Assignee: Sungrow Power Supply Co., Ltd., Hefei (CN)

( * ) Notice: Subject to any disclaimer, the term of this patent is extended or adjusted under 35 U.S.C. 154(b) by 183 days.

(21) Appl. No.: 18/350,035

(22) Filed: Jul. 11, 2023

(65) Prior Publication Data

US 2024/0113638 A1    Apr. 4, 2024

(30) Foreign Application Priority Data

Sep. 30, 2022    (CN) .......................... 202211214025.2

(51) Int. Cl.
*H02M 7/493* (2007.01)
*H02M 7/537* (2006.01)

(52) U.S. Cl.
CPC ........... *H02M 7/493* (2013.01); *H02M 7/537* (2013.01)

(58) Field of Classification Search
CPC .............................. H02M 7/493; H02M 7/537
See application file for complete search history.

(56) References Cited

U.S. PATENT DOCUMENTS

| 10,998,733 | B2 * | 5/2021 | Agorreta Malumbres ................... H02M 7/44 |
| 2014/0211521 | A1 * | 7/2014 | Mazumder ............ H02M 7/537 363/40 |
| 2019/0058408 | A1 * | 2/2019 | Hao ........................ H02M 3/01 |

* cited by examiner

*Primary Examiner* — Gary A Nash
(74) *Attorney, Agent, or Firm* — Wolf, Greenfield & Sacks, P.C.

(57) ABSTRACT

A single-stage multi-path direct current access converter and a control method thereof are provided. The single-stage multi-path direct current access converter includes an AC-side conversion circuit; at least two DC-side conversion circuits; and transformers corresponding to the at least two DC-side conversion circuits. AC sides of the at least two DC-side conversion circuits are respectively connected to primary windings of the corresponding transformers; secondary windings of the transformers are connected in parallel to a first side of the AC-side conversion circuit; each of the at least two DC-side conversion circuits is configured to invert DC power received by the DC-side conversion circuit, or to rectify AC power received by the DC-side conversion circuit; and the AC-side conversion circuit is configured to perform AC frequency conversion.

18 Claims, 12 Drawing Sheets

SINGLE-STAGE MULTI-PATH DIRECT CURRENT ACCESS CONVERTER AND CONTROL METHOD THEREOF

The present application claims priority to Chinese Patent Application No. 202211214025.2, titled "SINGLE-STAGE MULTI-PATH DIRECT CURRENT ACCESS CONVERTER AND CONTROL METHOD THEREOF", filed on Sep. 30, 2022 with the China National Intellectual Property Administration, which is incorporated herein by reference in its entirety.

FIELD

The present disclosure relates to the technical field of power electronics, and in particular to a single-stage multi-path direct current access converter and a control method thereof.

BACKGROUND

Photovoltaic inverters or micro inverters have been widely concerned, because a short-board effect caused by series connection of photovoltaic modules does not exist, and module-level operation, maintenance and maximum power point tracking (MPPT) can be realized. The basic structure is implemented as an inverter being connected to a photovoltaic module, and the inverters may be called one-for-one inverters. In order to further save the use of connectors, one-for-multiple inverters have been developed on the basis of one-for-one inverters. Considering cost and practicality, one-for-two inverters and one-for-four inverters are the most common, that is, one inverter is connected to two or four photovoltaic modules.

At present, commonly used photovoltaic inverters or micro inverters mainly have a two-stage structure. An Isolated DC converter of a front stage is configured to realize MPPT and busbar boosting, and a rear stage is connected to the power grid through an inverter. The isolated DC converter and an inverter circuit are connected with each other through a bus capacitor.

A two-stage structure of the one-to-one inverter is used in an one-for-multiple inverter. As shown in FIG. 1, an isolated DC converter, i.e., Isolated DC/DC, of the front stage is configured to realize MPPT and boosting of each component and share an inverter, i.e., Inverter, to output energy to the power grid. The inverters with the two-stage structure are easy to control, but the two-stage structure results in a lower upper limit of transmission efficiency.

SUMMARY

In view of this, a single-stage multi-path DC access converter and a control method thereof are provided by the present disclosure, to realize single-stage conversion of multi-path DC accesses and improve efficiency.

In order to achieve the above object, the following technical solutions are provided according to the present disclosure.

A single-stage multi-path DC access converter is provided according to a first aspect of the present disclosure. The single-stage multi-path DC access converter includes an AC-side conversion circuit, at least two DC-side conversion circuits and transformers corresponding to the at least two DC-side conversion circuit;

AC-sides of the DC-side conversion circuits are respectively connected to primary windings of the corresponding transformers;

secondary windings of the transformers are connected in parallel to a first side of the AC-side conversion circuit;

each of the at least two DC-side conversion circuits is configured to invert DC power received by the DC-side conversion circuit, or to rectify AC power received by the DC-side conversion circuit; and the AC-side conversion circuit is configured to perform AC frequency conversion.

In an embodiment, the secondary windings are connected to the first side of the AC-side conversion circuit through parallel common coupling points; and an equivalent impedance of a side of the common coupling points before being connected in parallel is greater than an equivalent impedance of a side of the common coupling points after being connected in parallel.

In an embodiment, an equivalent leakage inductance of the side of the common coupling points before being connected in parallel is greater than an equivalent leakage inductance of the side of the common coupling points after being connected in parallel.

In an embodiment, the equivalent leakage inductance of the side of the common coupling points before being connected in parallel includes leakage inductances of the transformers, or leakage inductances of the transformers and inductances integrated with the transformers.

In an embodiment, the single-stage multi-path DC access converter further includes impedance elements, which are respectively arranged between the AC-sides of the at least two DC-side conversion circuits and the primary windings; and/or, between the common coupling points and the secondary windings.

In an embodiment, the impedance elements include inductors, or, inductors and capacitors.

In an embodiment, there are preset relationships between impedances of the impedance elements and efficiency and magnitude of transmission power of the single-stage multi-path DC access converter.

In an embodiment, the transformers are single-phase transformers or three-phase transformers.

In an embodiment, a dotted terminal of the primary winding of each phase of the three-phase transformers is configured to connect to a corresponding phase on the AC-side of a corresponding DC-side conversion circuit, and the other terminal of the primary winding is connected to a reference ground; and two terminals of the secondary winding of each phase of the three-phase transformers are connected to a corresponding phase on the first side of the AC-side conversion circuit, and center taps of the secondary windings are connected with each other.

In an embodiment, in a case that the transformers are single-phase transformers, the at least two DC-side conversion circuits are half bridge circuits or full bridge circuits;

in a case that the transformers are three-phase transformers, the at least two DC-side conversion circuits are three-phase bridge circuits.

In an embodiment, the AC-side conversion circuit is a cyclo conversion circuit or a matrix conversion circuit.

In an embodiment, in a case that the transformers are single-phase transformers:

the AC-side conversion circuit is a half bridge conversion circuit, and a switch bridge arm and a capacitor bridge arm of the AC-side conversion circuit are connected in parallel between two terminals of a second side of the AC-side conversion circuit; the switch bridge arm includes two bidirectional switches configured as upper and lower half bridge arms, and the capacitor bridge arm includes two capacitor modules connected in series and with a same capacitance; and a midpoint of the switch bridge arm and a midpoint of the capacitor bridge arm are configured as two terminals of the first side of the AC-side conversion circuit; or, the AC-side conversion circuit is a full bridge conversion circuit, and two switch bridge arms of the AC-side conversion circuit are connected in parallel between the two terminals of a second side of the AC-side conversion circuit; and midpoints of the two switch bridge arms are configured as two terminals of the first side of the AC-side conversion circuit; or, the AC-side conversion circuit is a three-phase bridge conversion circuit, and three switch bridge arms of the AC-side conversion circuit are connected in parallel between two terminals of the first side of the AC-side conversion circuit; and midpoints of the three switch bridge arms are configured as terminals of a second side of the AC-side conversion circuit.

In an embodiment, in a case that the transformers are three-phase transformers, the AC-side conversion circuit includes three conversion circuits;

two sides of each of the conversion circuits are configured as a corresponding phase on two sides of the AC-side conversion circuit.

In an embodiment, each of the conversion circuits includes a rectifier bridge and a half bridge circuit;

an AC-side of the rectifier bridge is configured as a corresponding phase on the first side of the AC-side conversion circuit, a DC side of the rectifier bridge is connected to two terminals of the half bridge circuit, and a midpoint of the half bridge circuit is configured as the corresponding phase on a second side of the AC-side conversion circuit.

In an embodiment, the single-stage multi-path DC access converter further includes an AC-side filter circuit arranged on the second side of the AC-side conversion circuit; and/or, DC-side filter circuits respectively arranged on DC sides of the DC-side conversion circuits.

A control method for a single-stage multi-path DC access converter is provided according to a second aspect of the present disclosure. The control method is applied to the single-stage multi-path DC access converter according to any one of the above embodiments of the first aspect. The control method includes:

obtaining electrical parameters on two sides of the single-stage multi-path DC access converter and determining a power transmission direction required by the single-stage multi-path DC access converter;

determining a switching frequency and internal and external phase shift angles of the single-stage multi-path DC access converter, based on the electrical parameters and the power transmission direction; and generating, based on the switching frequency and the internal and external phase shift angles, control signals for switches of the single-stage multi-path DC access converter and outputting the control signals, to realize phase shift control for the single-stage multi-path DC access converter.

In an embodiment, the switching frequency is a frequency at which primary impedances of the transformers in the single-stage multi-path DC access converter are inductive.

In an embodiment, the internal and external phase shift angles include: internal phase shift angles and external phase shift angles of the DC-side conversion circuits in the single-stage multi-path DC access converter;

the external phase shift angles are determined based on the power transmission direction; and the internal phase shift angles and the external phase shift angles are independent of each other.

In the single-stage multi-path DC access converter according to the present disclosure, the AC sides of the DC-side conversion circuits are connected to the primary windings of the corresponding transformers, and the secondary windings of the transformers are connected in parallel to the first side of the AC-side conversion circuit. Due to the electrical isolation and mutual independence of the primary sides of the transformers, the voltage at a parallel connection point of the secondary windings is clamped by the AC-side conversion circuit, so that power decoupling can be realized between the DC-side conversion circuits, MPPT control can be performed independently for the DC-side conversion circuits, thereby realizing multi-path DC accesses. Moreover, the DC-side conversion circuits are configured to perform AC/DC conversion, and respective conversion ratios of primary voltages to secondary voltages can be realized based on turn ratios of the primary windings to the secondary windings of the transformers. The AC-side conversion circuit can be used to perform AC frequency conversion, thereby realizing single-stage conversion. Therefore, multi-path DC accesses can be realized in a form of single-stage conversion through the single-stage multi-path DC access converter, thereby improving conversion efficiency.

BRIEF DESCRIPTION OF THE DRAWINGS

In order to clearly illustrate technical solutions in the embodiments of the present disclosure or the conventional technology, the accompanying drawings used in the description of the embodiments or the conventional technology are briefly described below. It is apparent that the accompanying drawings in the following description only illustrate the embodiments of the present disclosure. For those skilled in the art, other drawings can be obtained based on the provided accompanying drawings without creative efforts.

DETAILED DESCRIPTION OF THE EMBODIMENTS

The technical solutions according to the embodiments of the present disclosure are clearly and completely described below in conjunction with the accompanying drawings in the embodiments of the present disclosure. Apparently, the described embodiments are only a part of the embodiments of the present disclosure, rather than all of the embodiments. Based on the embodiments of the present disclosure, other embodiments obtained by those skilled in the art without creative efforts fall within the protection scope of the present disclosure.

In the present disclosure, terms such as "comprise", "include", or any other variation thereof are intended to cover non-exclusive inclusion, such that a process, a method, article, or device that includes a series of elements not only includes the series of elements, but also other elements not explicitly listed, or also includes elements inherent in such a process, method, article, or device. Without further limitations, an element limited by the statement "comprise . . . " does not exclude the existence of other identical element in the process, method, article, or device that includes the element.

A single-stage multi-path DC access converter is provided by the present disclosure to realize single-stage conversion of multi-path DC access, so as to improve efficiency.

Figure 1:
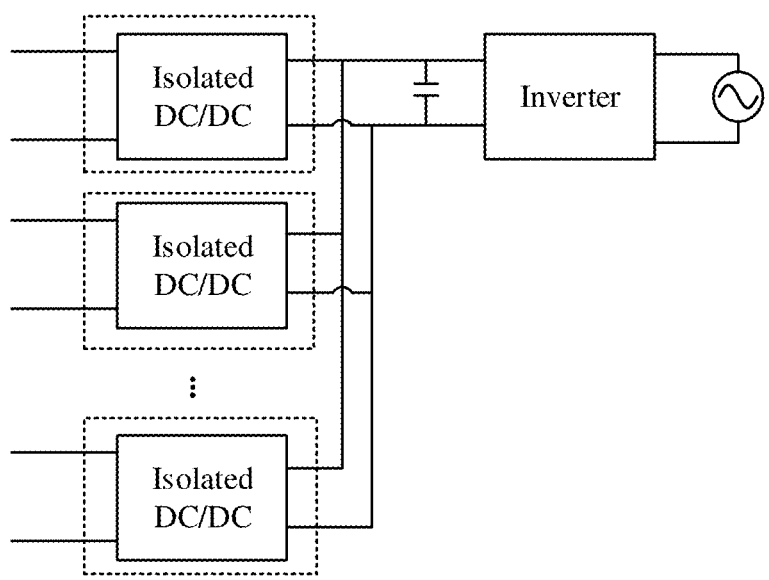
FIG. 1 is a schematic structural diagram of a two-stage isolated multi-path converter according to the conventional technology.
Figure 2:
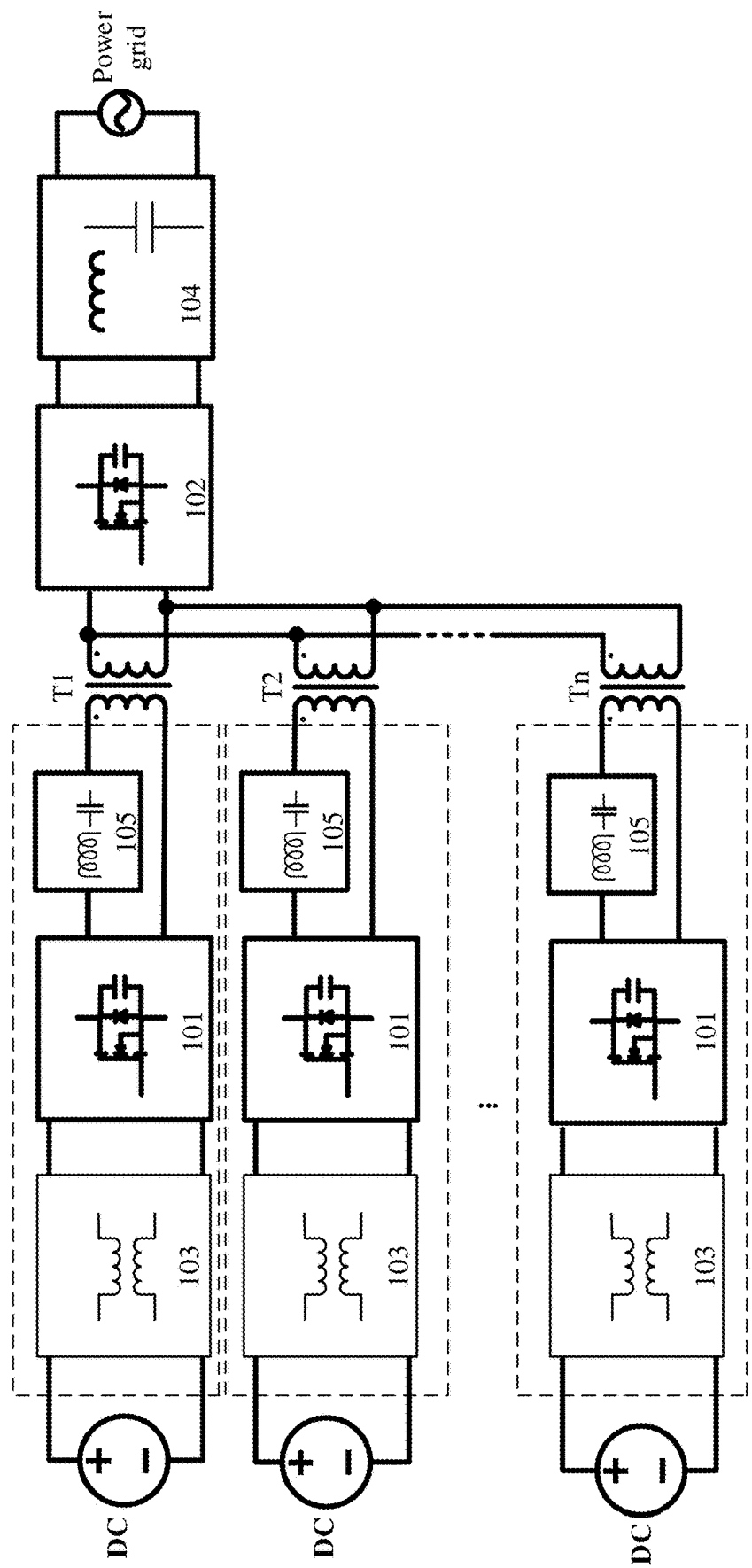
FIG. 2 is a schematic structural diagram of a single-stage multi-path DC access converter according to an embodiment of the present disclosure.

Referring to FIG. 2, the single-stage multi-path DC access converter includes an AC-side conversion circuit 102, at least two DC-side conversion circuits 101, and transformers corresponding to the DC-side conversion circuits 101 (Ti to Tn shown in FIG. 2). n is the number of the DC-side conversion circuits 101, and n is greater than 1:

AC sides of the DC-side conversion circuits 101 are respectively connected to primary windings of the corresponding transformers. DC sides of the DC-side conversion circuits 101 are configured as DC interfaces of the single-stage multi-path DC access converter, and connected to respective DC power supplies (DCs shown in FIG. 2) or DC loads. The DC interfaces may be connected to the DC power supplies, or may be connected to the DC loads, or part of the DC interfaces may be connected to the DC power supplies and the remaining part connected to the DC loads, depending on the specific application environment. In practical applications, the DC power supplies may be photovoltaic cell modules, power batteries, or fuel cells, and the DC loads may be power batteries in a charged state, and so on. Moreover, the DC sides of the DC-side conversion circuits 101 may further be provided with respective DC-side filter circuits 103.

The transformers may be high-frequency transformers, and particularly single-phase transformers (as shown in FIG. 2) or three-phase transformers, depending on the specific application environment. Moreover, the secondary windings of the transformers are connected in parallel to a first side of the AC-side conversion circuit 102. A second side of the AC-side conversion circuit 102 is configured as an AC interface of the single-stage multi-path DC access converter for connecting an AC source or an AC load. The AC source may be a power grid. In practical applications, the second side of the AC-side conversion circuit 102 may be connected to the AC source or the AC load through an AC-side filter circuit 104.

Figure 3:
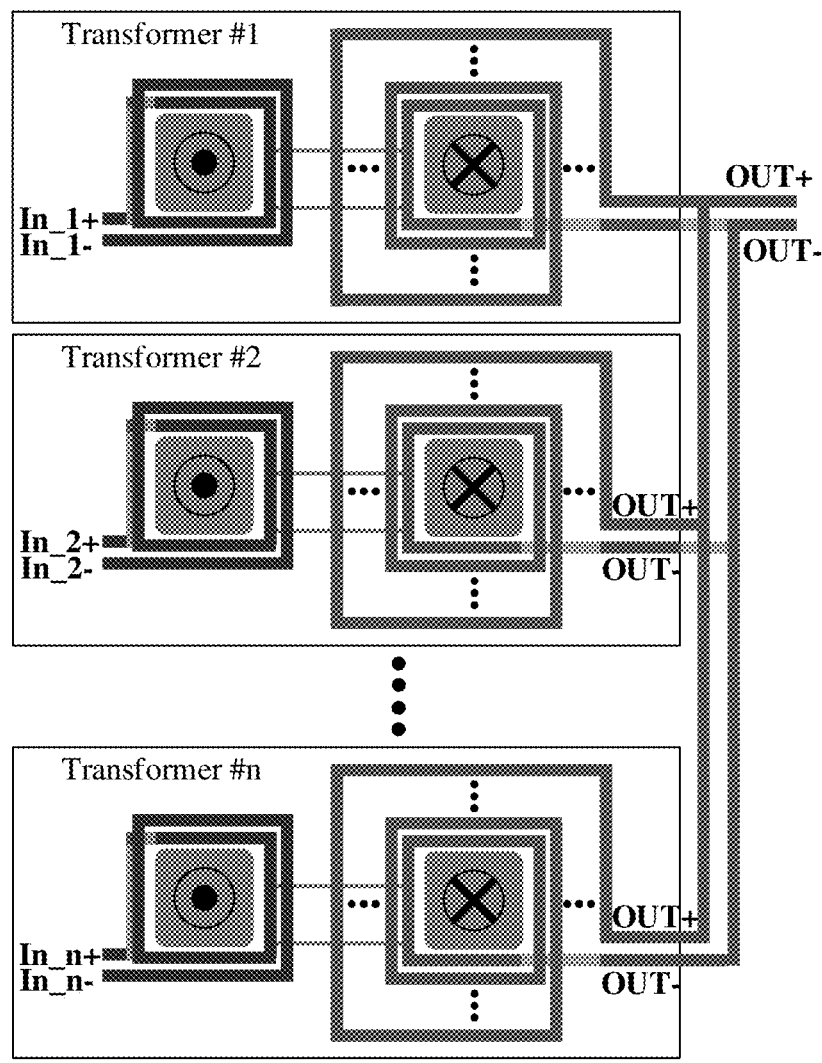
FIG. 3 is a schematic structural diagram of a distributed magnetic linkage circuit according to an embodiment of the present disclosure.
Figure 4:
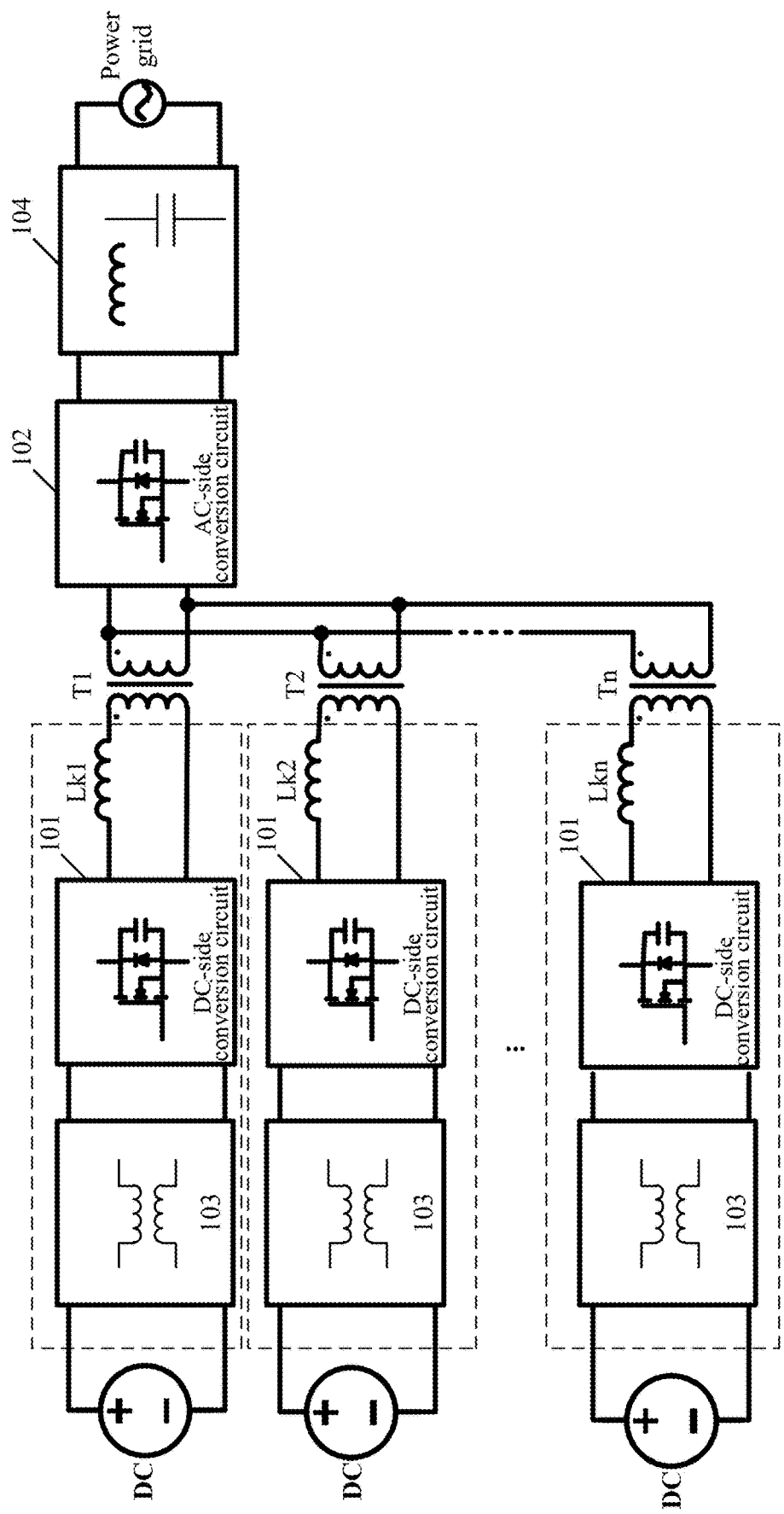
FIG. 4 is a schematic structural diagram of the single-stage multi-path DC access converter according to another embodiment of the present disclosure.

As shown in FIG. 3, magnetic fluxes of Transformer #1, Transformer #2 . . . Transformer #n are not be coupled with each other, and two terminals IN_1+/IN_1−, IN_2+/IN_2− . . . , IN_n+/IN_n− of the primary windings of the transformers are respectively connected to bipolar square wave modules (i.e. DC-side conversion circuits 101), and thus the primary sides of the transformers are electrically isolated and independent from each other, which can improve product safety. Moreover, benefiting from the structure of a distributed magnetic linkage circuit shown in FIG. 3, each of the DC-side conversion circuits 101 can realize decoupling of hardware for power transmission.

The output terminals OUT+ and OUT− of the secondary sides of the transformers are connected in parallel and clamped by a voltage at the first side of the AC-side conversion circuit 102. In a case that the above-mentioned hardware decoupling design principles are met, all paths can be considered independent from each other, and thus MPPT control can be performed independently for each path.

The specific working principle is described as follows:

In a case that power is transmitted forward, each of the DC-side conversion circuits 101 inverts DC power received by the DC-side conversion circuit to generate a pulsating voltage. The pulsating voltages are respectively transmitted to primary windings of the high-frequency transformers. The pulsating voltages with high-frequency are coupled with the AC-side conversion circuit 102 after passing through the high-frequency transformers, and then AC frequency conversion is performed on the pulsating voltages by the AC-side conversion circuit 102. For example, AC power transmission is performed at a frequency required by a power grid or an AC load, that is, high-frequency (such as 100 kHz) AC power is converted to low-frequency (such as power frequency 50 Hz, 60 Hz) AC power, and the power grid or AC load is connected through a filter circuit and other circuits, to realize the single-stage conversion.

In a case that power is transmitted reversely, low-frequency AC power of the AC source is converted into high-frequency AC power through the AC-side conversion circuit 102, and the high-frequency AC power is transmitted to the DC-side conversion circuits 101 through the transformers T. The DC-side conversion circuits 101 rectify the AC power received by themselves and output rectified AC power to the DC loads.

In the single-stage multi-path DC access converter according to the embodiment, the DC sides of the multiple DC-side conversion circuits 101 have independent input, and magnetic linkages of the DC-side conversion circuits 101 are not coupled, so that the primary sides of the transformers are electrically isolated and independent from each other. Further, positive output terminals and negative output terminals of the secondary sides of the distributed transformers are connected in parallel, so that the voltage at the connection point in parallel of the secondary windings is clamped by the AC-side conversion circuit 102, and thus it is enabled to realize power decoupling between the DC-side conversion circuits 101 in hardware without complex control algorithms to realize power decoupling in software, and realize input under independent MPPT control for the multi-path. In the case that power is transmitted reversely, multi-path DC outputs can be realized. Moreover, the DC-side conversion circuits 101 are configured to realize AC/DC conversion, and the corresponding conversion ratios of primary voltages to secondary voltages can be realized based on turn ratios of the primary windings to the secondary windings of the transformers. The AC-side conversion circuit 102 can perform AC frequency conversion, thereby realizing single-stage conversion, with high potential of transmission efficiency and small product volume. Therefore, multi-path DC accesses can be realized in a form of single-stage conversion by the single-stage multi-path DC access converter, thereby improving conversion efficiency.

It is worth noting that a single-stage DC/AC conversion and a magnetic linkage distributed structure are adopted in the embodiment, which not only enables multiple photovoltaic modules to realize grid connection of inverters in the form of electrical isolation and uncoupled magnetic circuit, reducing the difficulty of system control, but also enables n transformers independent and distributed in the single-stage multi-path DC access converter. The distribution of heat facilitates heat dissipation, thereby improving the system stability. In addition, the secondary sides of the transformers are connected in parallel, allowing for the sharing of some components and structural components, maximizing component sharing and reducing system costs.

Based on the previous embodiment, in practical applications, the secondary windings may be connected to the first side of the AC-side conversion circuit 102 through parallel common coupling points. An equivalent impedance of a side (i.e. the left side shown in FIG. 2) of the common coupling points before being connected in parallel is greater than an equivalent impedance of a side (i.e. the right side shown in FIG. 2) of the common coupling points after being connected in parallel. For example, the equivalent impedance of the side of the common coupling points after being connected in parallel may be set to zero, or the equivalent impedance of the side (i.e. the left side shown in FIG. 2) of the common coupling points before being connected in parallel may be set to be much greater than the equivalent impedance on the side (i.e. the right side shown in FIG. 2) after being connected in parallel, which can achieve power decoupling between the DC-side conversion circuits and enable independent input of photovoltaic energy for multi-path.

In order to realize the above impedance setting, specifically, an equivalent leakage inductance of the side of the common coupling points before being connected in parallel can be greater than an equivalent leakage inductance of the side of the common coupling points after being connected in parallel. The equivalent leakage inductance of the side of the common coupling points before being connected in parallel may include leakage inductances of the transformers, or include the leakage inductances of the transformers and the inductances integrated with the transformers, depending on the specific application environment, which fall within the protection scope of the present disclosure.

Alternatively, the above impedance settings may be achieved by adding additional impedance elements, for example: (1) arranging impedance elements 105 between the AC sides of the DC-side conversion circuits 101 and the respective primary windings (as shown in FIG. 2); (2) arranging corresponding impedance elements between the common coupling points and the secondary windings (not shown); (3) arranging impedance elements between the AC sides of the DC-side conversion circuits 101 and the respective primary windings, as well as between the common coupling points and the secondary windings (not shown). No matter which implementation is adopted, in a case of adding impedance elements, there are preset relationships between impedances of the impedance elements and efficiency and magnitude of the transmission power of the single-stage multi-path DC access converter, and the preset relationships depend on the specific application environment, which fall within the protection scope of the present disclosure. That is, the sizes of the additional impedance elements may be selected based on a comprehensive consideration of the efficiency of transmission power and the ability of transmission power.

In practical applications, all impedance elements 105 may be inductors, or may be in other forms, such as inductors and capacitors (as shown in FIG. 2), and the inductors and the capacitors may be connected in series or in other ways. Moreover, the inductances of the impedance elements 105 may be the same or different from each other, depending on the specific application environment, which fall within the protection scope of the present disclosure.

It should be noted that the above-mentioned settings for the leakage inductances of the transformers, and additionally adding impedance elements, may be performed simultaneously, as long as the requirements for the equivalent impedances on two sides of the common coupling points can be met, which falls within the protection scope of the present disclosure.

On the basis of the above embodiments, some specific optional implementation forms for the DC-side conversion circuits 101 and the AC-side conversion circuit 102 in the single-stage multi-path DC access converter are provided in the embodiment.

Figure 5A:
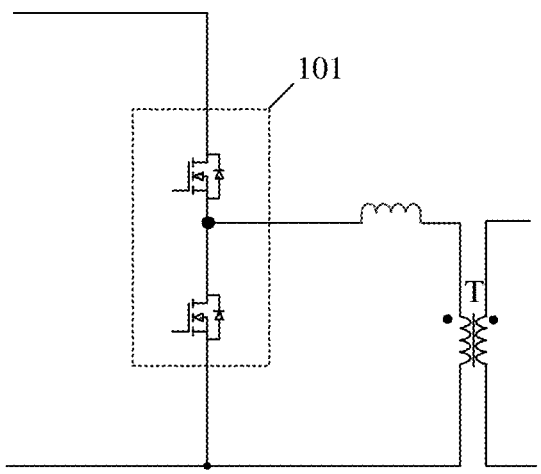
FIG. 5a is a schematic structural diagram of a DC-side conversion circuit according to an embodiment of the present disclosure.
Figure 5B:
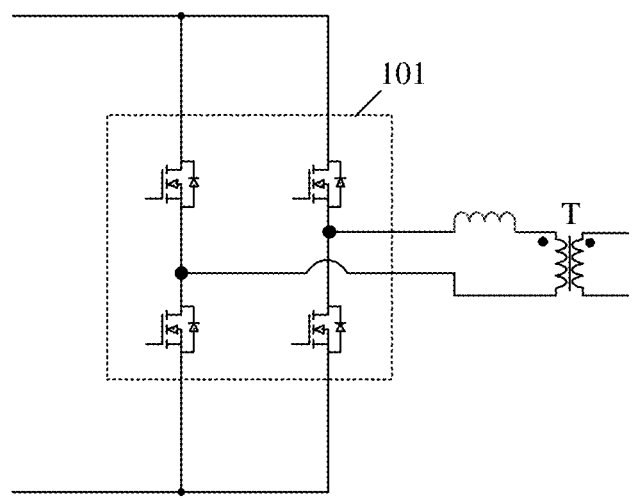
FIG. 5b is a schematic structural diagram of a DC-side conversion circuit according to another embodiment of the present disclosure.

For example, in a case that the transformers T are single-phase transformers, the DC-side conversion circuits 101 may be half bridge circuits (as shown in FIG. 5a) or full bridge circuits (as shown in FIG. 5b) according to the power level.

Figure 5C:
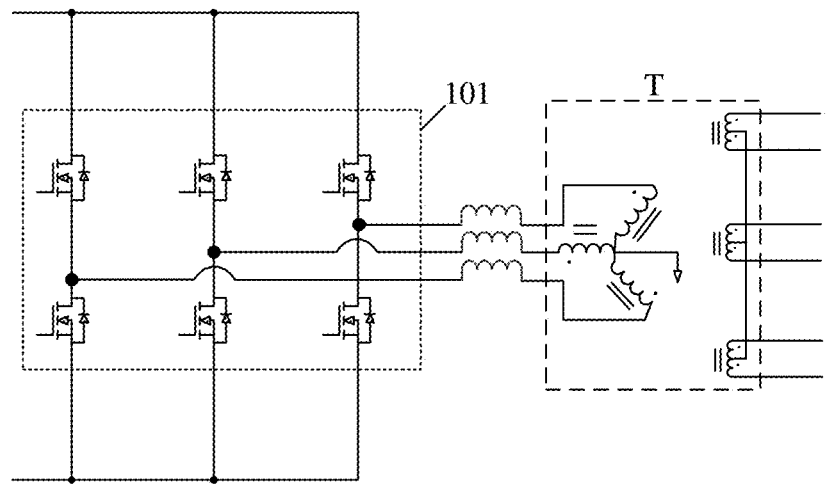
FIG. 5c is a schematic structural diagram of a DC-side conversion circuit according to another embodiment of the present disclosure.

In a case that the transformers T are three-phase transformers, as shown in FIG. 5c, a dotted terminal of the primary winding of each phase of the three-phase transformers is connected directly or through an impedance element (shown as an inductor in the figure) to a corresponding phase on the AC side of the corresponding DC-side conversion circuit 101, and the other terminal of the primary winding is connected to a reference ground. Two terminals of the secondary winding of each phase of the three-phase transformers T are connected to a corresponding phase on the first side of the AC-side conversion circuit 102, and center taps of the secondary windings are connected with each other. In this case, the DC-side conversion circuits 101 may also be three-phase bridge circuits, and midpoints of bridge arms of phases of the three-phase bridge circuits are connected with each other, directly or through the impedance elements, to the primary windings of phases of the transformer T, respectively.

In practical applications, the DC-side conversion circuits 101 may also have other conversion structures for converting DC voltage to high-frequency pulsating voltage. The above two examples are provided herein, and not limited to them.

Regardless of the structure adopted, the DC-side conversion circuits 101 may include power semiconductor devices such as Metal-Oxide-Semiconductor Field-Effect Transistors (MOSFETs) or Insulated Gate Bipolar Transistors (IGBTs) with antiparallel diodes, but are not limited to this.

Figure 6A:
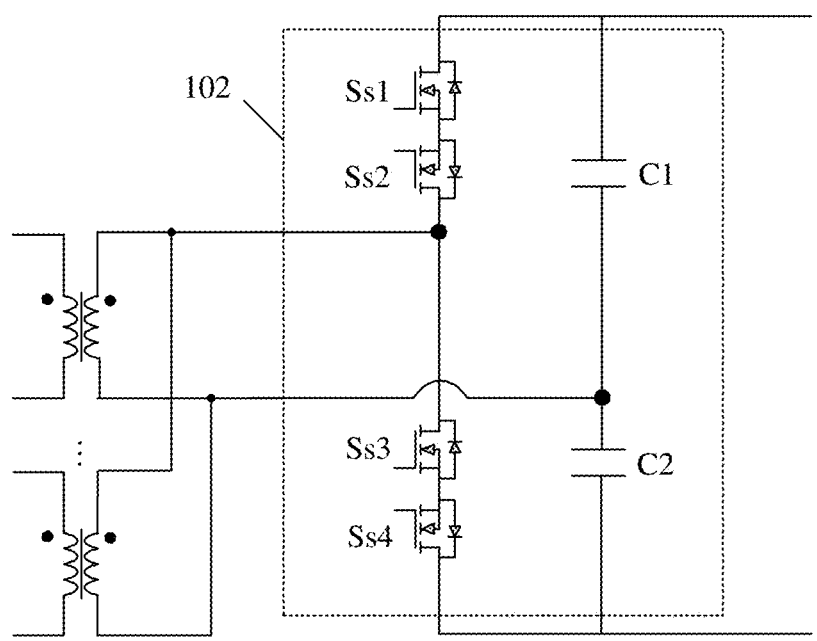
FIG. 6a is a structural diagram of an AC-side conversion circuit according to an embodiment of the present disclosure.
Figure 6B:
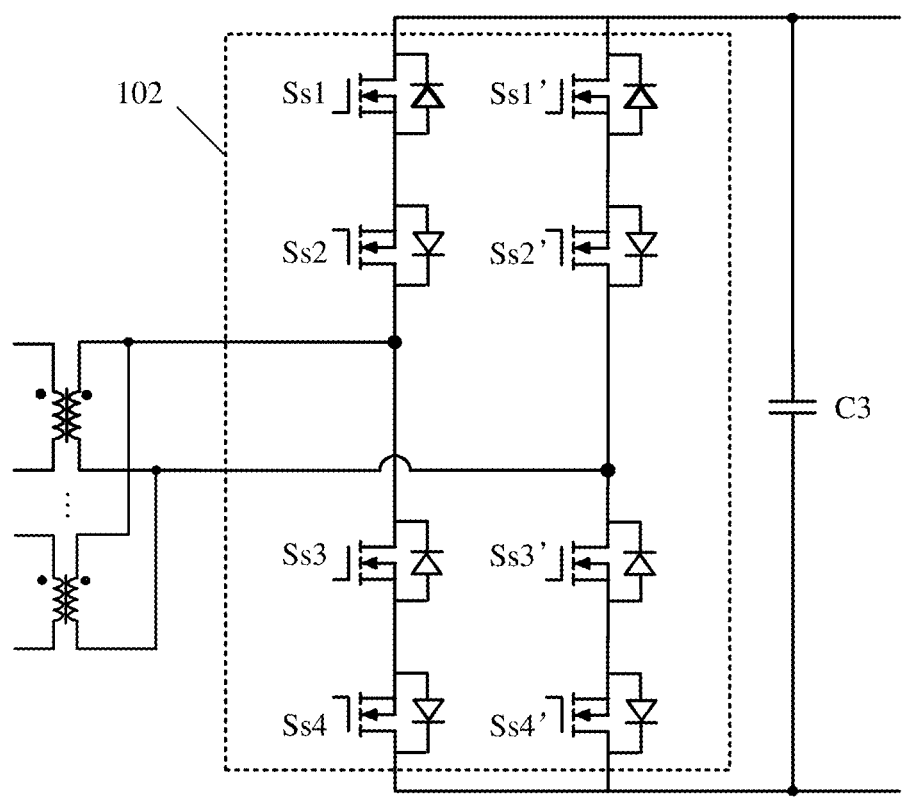
FIG. 6b is a structural diagram of an AC-side conversion circuit according to another embodiment of the present disclosure.
Figure 6C:
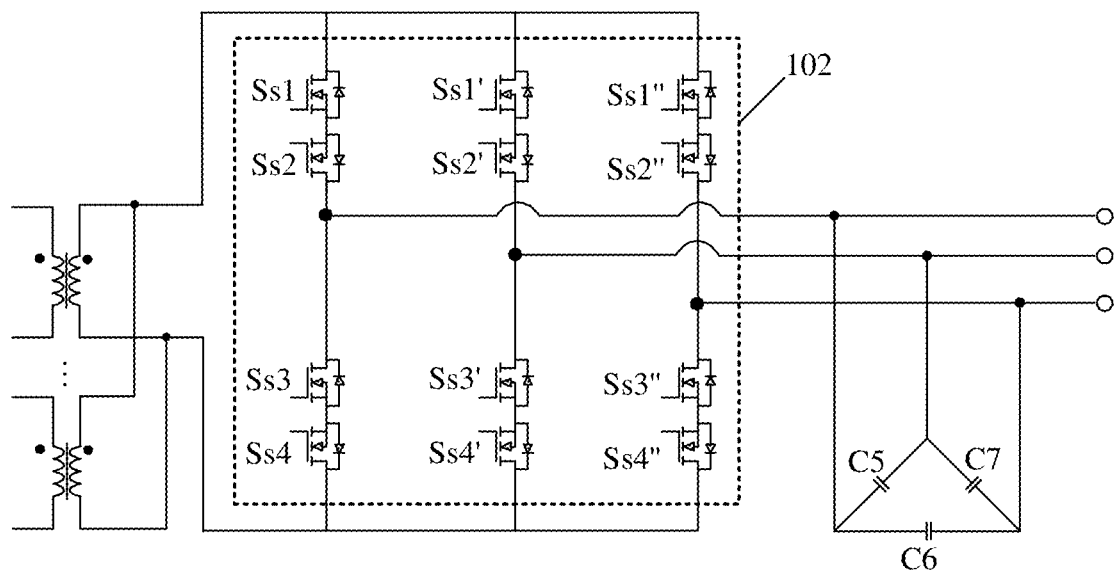
FIG. 6c is a structural diagram of an AC-side conversion circuit according to yet another embodiment of the present disclosure.
Figure 6D:
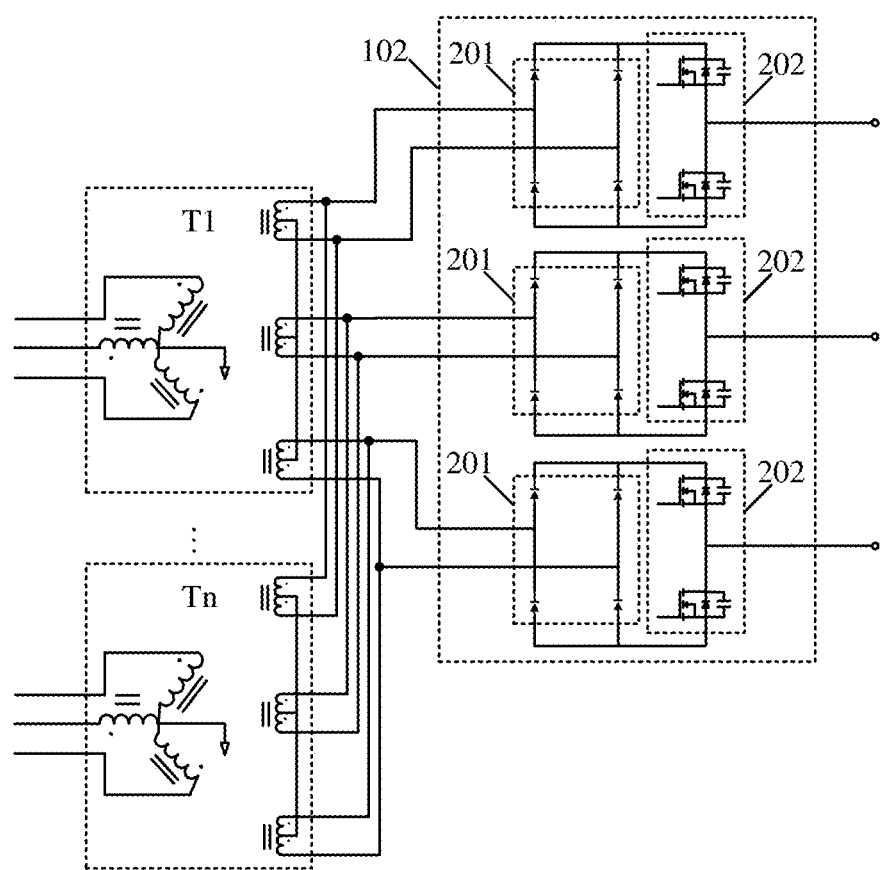
FIG. 6d is a structural diagram of an AC-side conversion circuit according to a further embodiment of the present disclosure.

Since the AC-side conversion circuit 102 needs to deal with an AC voltage with polarity changes, various cyclo conversion structures as shown in FIGS. 6a to 6d may be selected as the AC-side conversion circuit 102 according to the power level. Specifically, in a case that the transformers are single-phase transformers, the AC-side conversion circuit 102 may be a hybrid conversion circuit including a bidirectional switch bridge arm and a capacitor bridge arm (as shown in FIG. 6a), or a conversion circuit including only bidirectional switch bridge arms (as shown in FIGS. 6b and 6c). In the application scenario of three-phase AC loads, if the transformers are single-phase transformers, the AC-side conversion circuit 102 may be a cycloconverter including three bidirectional switch bridge arms (as shown in FIG. 6c). If the transformers are three-phase transformers, the AC-side conversion circuit 102 may include three conversion circuits (as shown in FIG. 6d).

Referring to FIG. 6a, the transformers are single-phase transformers. The AC-side conversion circuit 102 is a half bridge conversion circuit. A switch bridge arm and a capacitor bridge arm of the half bridge conversion circuit are connected in parallel between two terminals of a second side of the AC-side conversion circuit 102. The switch bridge arm includes two bidirectional switches connected in series, the bidirectional switch including switches SS1 and SS2 is configured as an upper half bridge arm, and the bidirectional switch including switches SS3 and SS4 is configured as a lower half bridge arm. The capacitor bridge arm includes two capacitor modules C1 and C2 connected in series and with a same capacitance. A midpoint of the switch bridge arm and a midpoint of the capacitor bridge arm are configured as two terminals of the first side of the AC-side conversion circuit 102, respectively.

Referring to FIG. 6b, the transformers are single-phase transformers. The AC-side conversion circuit 102 is a full bridge conversion circuit. Two switch bridge arms of the full bridge conversion circuit are connected in parallel between two terminals of the second side of the AC-side conversion circuit 102. Each of the switch bridge arms includes two bidirectional switches connected in series. In one of the switch bridge arms, the bidirectional switch including switches Ss1 and Ss2 is configured as an upper half bridge arm, and the bidirectional switch including switches Ss3 and Ss4 is configured as a lower half bridge arm. In the other of the switch bridge arms, the bidirectional switch including switches Ss1' and Ss2' is configured as an upper half bridge arm, and the bidirectional switch including switches Ss3' and Ss4' is configured as a lower half bridge arm. Midpoints of the two switch bridge arms are configured as two terminals of the first side of the AC-side conversion circuit 102. The AC-side filter circuit 104 shown in FIG. 2A includes a capacitor module C3.

Referring to FIG. 6c, the transformers are single-phase transformers. The AC-side conversion circuit 102 is a three-phase bridge conversion circuit. Three switch bridge arms of the three-phase bridge conversion circuit are connected in parallel between two terminals of the first side of the AC-side conversion circuit 102. Each of the switch bridge arms includes two bidirectional switches connected in series. In one of the switch bridge arms, the bidirectional switch including switches Ss1 and Ss2 is configured as an upper half bridge arm, and the bidirectional switch including switches Ss3 and Ss4 is configured as a lower half bridge arm. In another of the switch bridge arms, the bidirectional switch including switches Ss1' and Ss2' is configured as an upper half bridge arm, and the bidirectional switch including switches Ss3' and Ss4' is configured as a lower half bridge arm. In a third switch bridge arm of the switch bridge arms, the bidirectional switch including switches Ss1" and Ss2" is configured as an upper half bridge arm, and the bidirectional switch including switches Ss3" and Ss4" is configured as a lower half bridge arm. Midpoints of the three switch bridge arms are configured as terminals of the second side of the AC-side conversion circuit 102. Moreover, respective capacitor modules C5 to C7, belonging to the AC-side filter circuit 104 shown in FIG. 2, are arranged between any two of the terminals of the second side of the AC-side conversion circuit 102.

Referring to FIG. 6d, in this case, the transformers are three-phase transformers. The AC-side conversion circuit 102 includes three conversion circuits. Two sides of each of the conversion circuits are configured as a corresponding phase on two sides of the AC-side conversion circuit 102. In practical applications, each of the conversion circuits may be shown in FIG. 6d, including a rectifier bridge 201 and a half bridge circuit 202. An AC side of the rectifier bridge 201 is configured as the corresponding phase on the first side of the AC-side conversion circuit 102, a DC side of the rectifier bridge 201 is connected to two terminals of the half bridge circuit 202, and a midpoint of the half bridge circuit 202 is configured as the corresponding phase on the second side of the AC-side conversion circuit 102. Specifically, in one conversion circuit, the AC side of the rectifier bridge 201 is configured as A-phase on the first side of the AC-side conversion circuit 102, and the midpoint of the half bridge circuit 202 is configured as A-phase on the second side of the AC-side conversion circuit 102. In the half bridge circuit of another conversion circuit, the AC side of the rectifier bridge 201 is configured as B-phase on the first side of the AC-side conversion circuit 102, and the midpoint of the half bridge circuit 202 is configured as B-phase on the second side of the AC-side conversion circuit 102. In the third conversion circuit, the AC side of the rectifier bridge 201 is configured as C-phase on the first side of the AC-side conversion circuit 102, and the midpoint of the half bridge circuit 202 is configured as C-phase on the second side of the AC-side conversion circuit 102. The rectifier bridge 201 may be a rectifier bridge including diodes as shown in FIG. 6d, or have a full bridge structure including controllable semiconductor switches such as MOSFETs or IGBTs, to realize bidirectional energy transmission. The implementations of the rectifier bridge 201 depend on the specific application environment and fall within the protection scope of the present disclosure.

In practical applications, each of the above capacitor modules may be a capacitor or multiple capacitors connected in series-parallel. The implementations depend on the specific application environment and fall within the protection scope of the present disclosure.

Moreover, other conversion structures that can realize voltage inversion may be selected for the AC-side conversion circuit 102, such as various forms of matrix conversion circuits that can realize adaptive connections with corresponding AC sources or AC loads. It should be noted that the power devices in FIGS. 6a to 6d are only examples, and in practical applications, MOSFETs or IGBTs may be selected as required. For example, since the power processed by the AC-side conversion circuit 102 is a sum of n input powers, the voltage and the power at the AC-side conversion circuit 102 are high. If MOSFETs cannot meet the requirements, high-voltage devices such as IGBTs may be selected. In addition, in order to improve efficiency, silicon nitride (SiC), gallium nitride (GaN), or a hybrid device including IGBT and SiC may also be selected. The implementations depend on the specific application environment and fall within the protection scope of the present disclosure.

Figure 7:
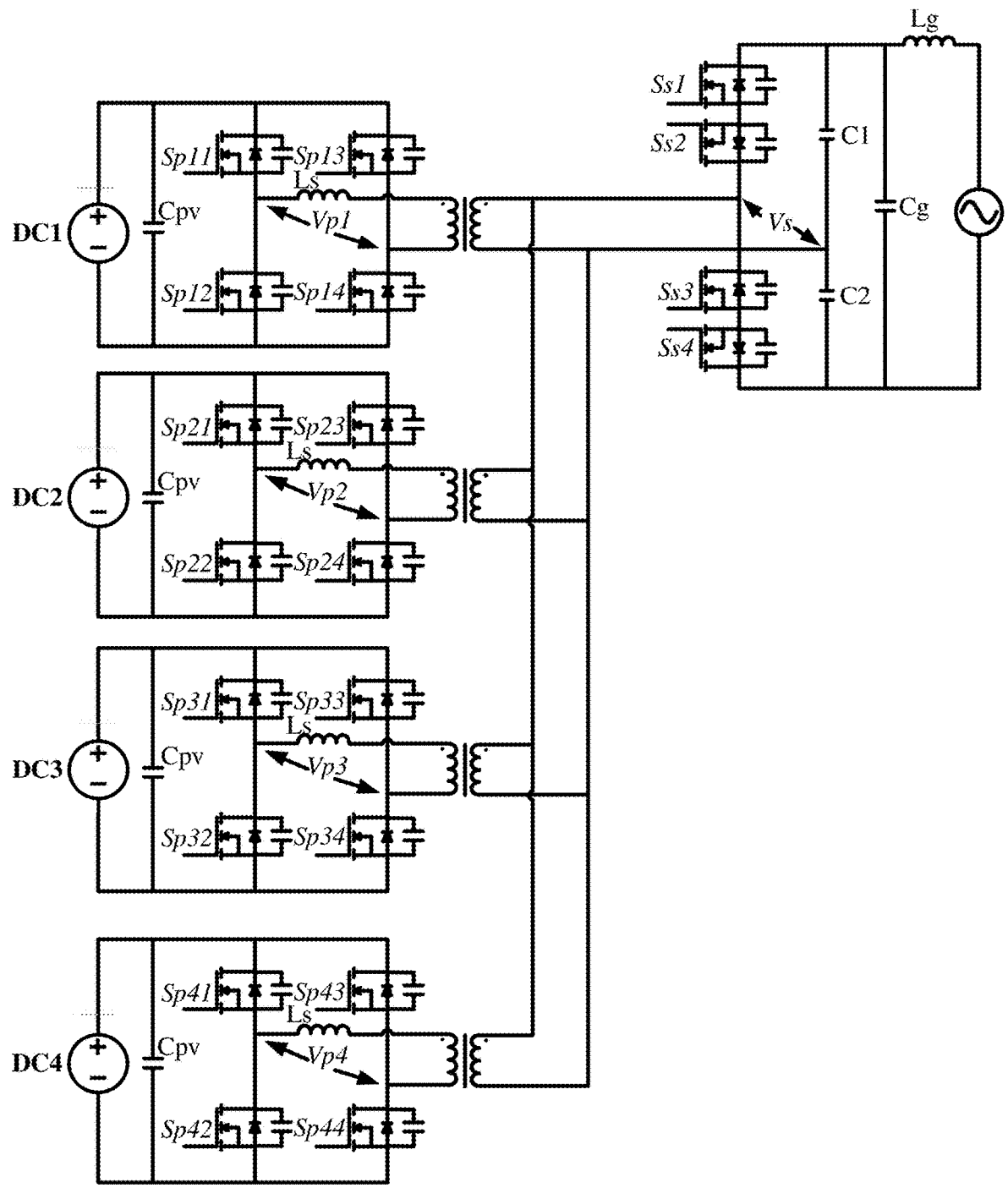
FIG. 7 is a specific circuit diagram of a single-stage multi-path DC access converter according to an embodiment of the present disclosure.

Taking four inputs as an example, FIG. 7 shows a converter with H-bridge structures on the primary side and a hybrid circuit including a switch bridge arm and a capacitor bridge arm on the secondary side.

Referring to FIG. 7, the DC-side conversion circuits include switches Sp11 to Sp14, switches Sp21 to Sp24, switches Sp31 to Sp34 and switches Sp41 to Sp44, respectively. Each DC-side filter circuit includes a capacitor module Cpv. Since photovoltaic modules (DC1 to DC4 as shown in FIG. 7) connected to such inverters are generally of a same model, the impedances of the four input bridge arms may be designed to be equal. In FIG. 7, each H-bridge is connected to the corresponding transformer through an inductor Ls as an impedance element. The inductors Ls may be designed with a same inductance. In practical applications, the impedance elements may also be configured by connecting inductors and capacitors in series, or impedance elements may be arranged on the primary side and the secondary side of each transformer.

Referring to FIG. 7, each of the secondary sides are implemented as a half bridge cycloconverter in the form of splitting capacitors, to reduce Electro Magnetic Interference (EMI). That is, the AC-side conversion circuit includes switches Ss11 to Ss14 and capacitor modules C1 and C2. The capacitor modules C1 and C2 are designed as same capacitors. The AC-side filter circuit includes an inductor module Lg and a capacitor module Cg.

In FIG. 7, AC-side voltages of the DC-side conversion circuits are represented as Vp1 to Vp4 respectively, and an AC-side voltage of the AC-side conversion circuit is represented as $V_S$. Through conversion of the circuit of the secondary side of the inverter shown in FIG. 7 to the primary side, a fundamental equivalent circuit shown in FIG. 8 can be obtained. A full bridge switch network may be equivalent to a voltage source $\dot{V}_p$, power transmission paths of the transformers are equivalent to external inductors $L_s$, primary leakage inductors $L_{kp}$ and secondary leakage inductors $L_{ks}$ which are connected in series. A full bridge node S of the primary side represents the parallel connection of the secondary sides of the transformers. In addition, in FIG. 8, $\dot{V}_{px}$ (x=1, 2, 3, 4) is a fundamental equivalent voltage of a high-frequency pulsating voltage of any one of the bridge arms, $\dot{V}_s$ is a fundamental voltage of the power grid, $\dot{I}_x$ (x=1, 2, 3, 4) is an output current of any one of the DC-side conversion circuits 101, and $\dot{I}_o$ is an input current of the AC-side conversion circuit 102.

Figure 8:
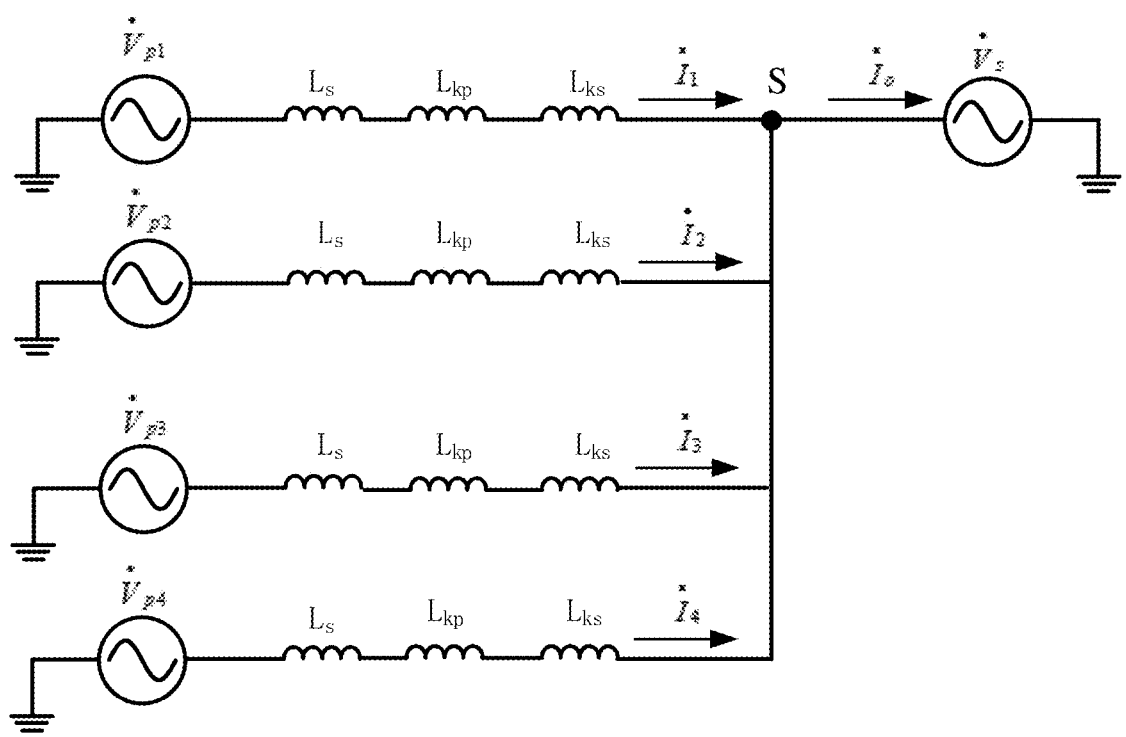
FIG. 8 is a fundamental equivalent circuit diagram of a single-stage multi-path DC access converter according to an embodiment of the present disclosure.

As shown in FIG. 8, if an impedance of the secondary bridge arms is about 0 or much less than an impedance of the primary bridge arms, a variation of $\dot{I}_o$ is a sum of $\dot{I}_1$ to $\dot{I}_4$, the potential at the node S is constant, variations of $\dot{I}_x$ are completely determined by $\dot{V}_{px}$, so that the primary voltages of the transformers are clamped by the secondary bridge arm to realize decoupling.

In the embodiment, the difficulty of controlling the system can be reduced by using a single-stage DC/AC inverter structure, electrical isolation at the photovoltaic modules and uncoupling of magnetic circuits.

Figure 9:
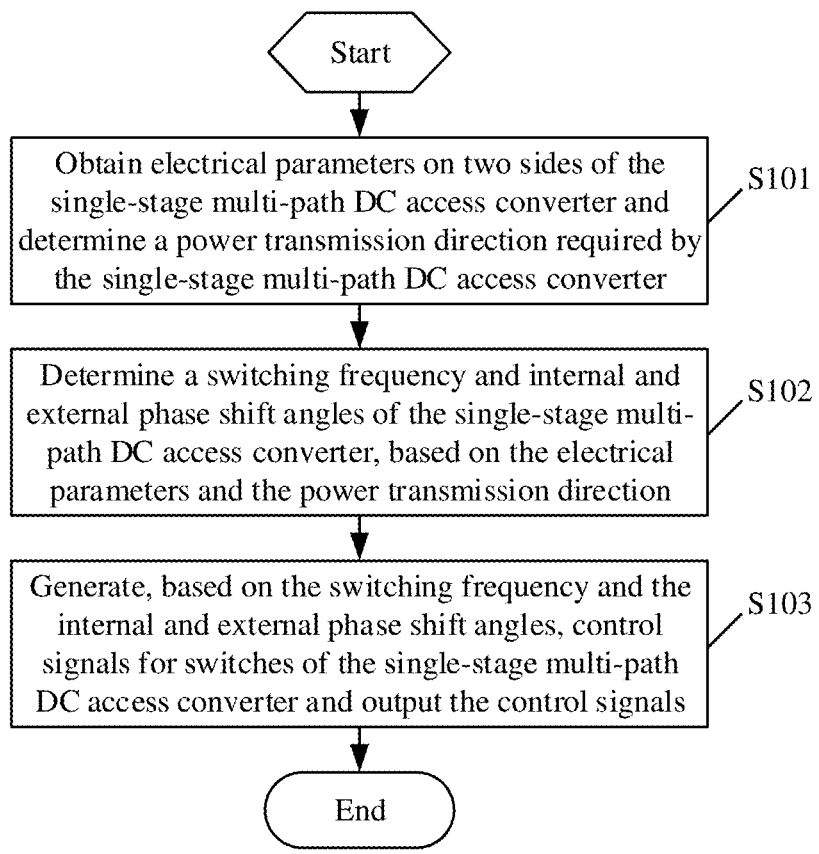
FIG. 9 is a flowchart of a control method for a single-stage multi-path DC access converter according to an embodiment of the present disclosure.

A control method for a single-stage multi-path DC access converter is provided according to another embodiment of the present disclosure, the control method is applied to the single-stage multi-path DC access converter according to any one of the above embodiments. The control method is shown in FIG. 9, specifically including:

In step S101, electrical parameters on two sides of the single-stage multi-path DC access converter is obtained and a power transmission direction of the single-stage multi-path DC access converter is determined.

The electrical parameters on two sides include at least one of voltages, currents, and powers on two sides of the single-stage multi-path DC access converter, depending on the specific application environment.

The power transmission direction of the single-stage multi-path DC access converter includes: a forward transmission direction during performing power inversion from a DC interface to an AC interface, and a reverse transmission direction during performing power rectification from the AC interface to the DC interface.

In step S102, a switching frequency and internal and external phase shift angles of the single-stage multi-path DC access converter are determined based on the electrical parameters and the power transmission direction.

After the switching frequency is determined, action cycles Ts of the switches in the single-stage multi-path DC access converter can be determined.

Preferably, the switching frequency is a frequency at which the primary impedances of the transformers in the single-stage multi-path DC access converter are inductive, thereby providing conditions for Zero Voltage Switch (ZVS) of the device.

Figure 10:
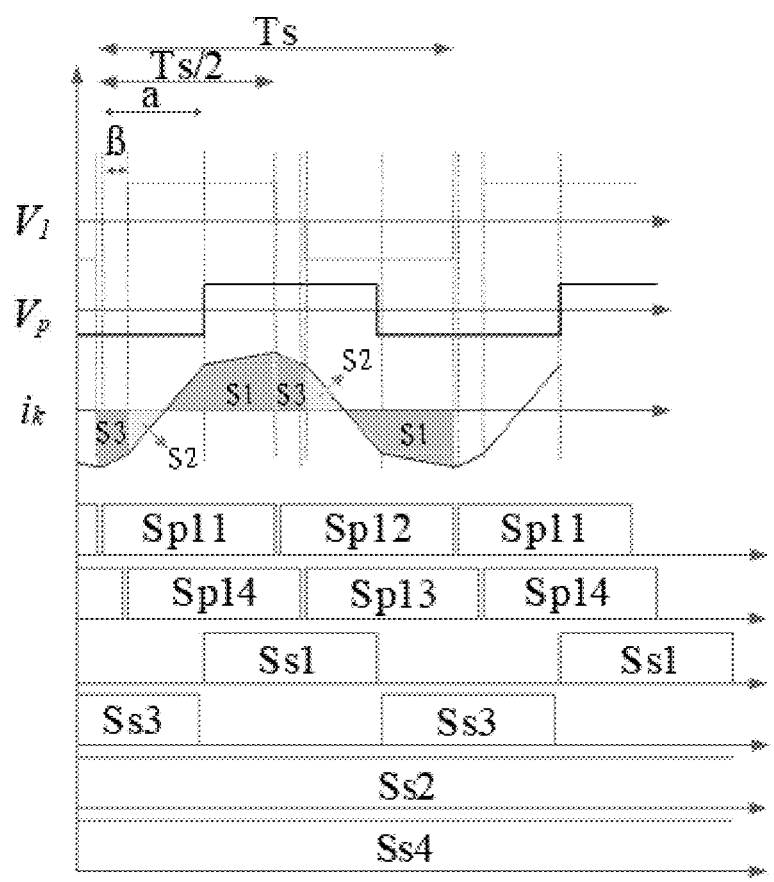
FIG. 10 shows an oscillogram of driving signals of a single-stage multi-path DC access converter according to an embodiment of the present disclosure during a positive half cycle of power grid.

The internal and external phase shift angles includes: internal phase shift angles β and external phase shift angles α for the DC-side conversion circuits in the single-stage multi-path DC access converter. Taking DC1 shown in FIG. 7 in a case that the grid voltage is positive as an example and referring to FIG. 10, the power transmission direction can be controlled by adjusting the external phase shift angle α to lead and lag. If a power area S1 is greater than a power area S2, forward power transmission is realized by the topology. If the power area S1 is smaller than the power area S2, reverse power transmission is realized by the the topology. In FIG. 10, $V_1$ is an output voltage of the DC-side conversion circuit 101 corresponding to DC1, $V_p$ is a primary voltage of the transformer T, $i_k$ is a primary current of the transformer T. The energy for soft switching can be provided due to the presence of a power area S3.

Moreover, the internal phase shift angles (3 and the external phase shift angles α are independent from each other.

In step S103, control signals for switches of the single-stage multi-path DC access converter are generated based on the switching frequency and the internal and external phase shift angles and outputted, to realize phase shift control for the single-stage multi-path DC access converter.

Driving signals for the switches can be generated by passing the control signals through corresponding driving circuits. In FIG. 7, the switches in the DC-side conversion circuits 101 and the AC-side conversion circuit 102 may be driven with a duty ratio of 50%, and certain dead times are set between complementary driving signals, such as the driving signals of Sp11 to Sp14 and Ss1 to Ss4 as shown in FIG. 10.

In each of the DC-side conversion circuits 101, the switch of the upper half bridge arm is operated complementarily to the switch of the lower half bridge arm in each bridge arm, and the drive signals of the switches of different half bridge arms in different bridge arms differ by an internal phase shift angle (3. Referring to FIG. 10, in the DC-side conversion circuit 101 corresponding to DC1, switches Sp11 and Sp12 operate complementarily, switches Sp13 and Sp14 operate complementarily, and the driving signal of the switch Sp11 is ahead of the driving signal of the switch Sp14 by an angle of β.

In the AC-side conversion circuit 102, when an instantaneous value of the grid voltage is greater than zero, the switch Ss1, for which a conduction direction of a diode is directed to the power grid, in the upper half bridge arm and the switch Ss3, for which a conduction direction of a diode is directed to the secondary winding, in the lower half bridge arm operate complementarily, and other switches are directly turned on. When the instantaneous value of the grid voltage is less than zero, the switch Ss2, for which a conduction direction of a diode is directed to the secondary winding, in the upper half bridge arm and the switch Ss4, for which a conduction direction of a diode is directed to the power grid, in the lower half bridge arm operate complementarily, and other switches are directly turned on. Moreover, the driving signals of the switches in the DC-side conversion circuits 101 differ from the driving signals of the switches in the AC-side conversion circuit 102 by an external phase shift angle of a. Taking DC1 as an example, when the grid voltage is positive, the switches Ss1 and Ss3 operate complementarily, the switches Ss2 and Ss4 are constantly turned on, and the driving signal of the switch Sp11 is ahead of the driving signal of the switch Ss1 by an angle of a (the oscillogram of signals is shown in FIG. 10). When the grid voltage is negative, the switches Ss2 and Ss4 operate complementarily, the switches Ss1 and Ss3 are constantly turned on, and the driving signal of the switch Sp11 is ahead of the driving signal of the switch Ss4 by an angle of a (not shown).

The logics of the driving signals for DC2 to DC4 are the same as DC1, but the specific values of α and β for each DC are independent from each other, that is, the internal phase shift angles and the external phase shift angles are independent from each other. Each DC is controlled by two control freedom degrees (angles α and β), because the combination of two control freedom degrees can reduce effective values of output currents of the bridge arms in the transmission of the same power, thereby achieving optimization of conduction loss.

The same and similar parts between the various embodiments in the description may be referred to each other, and each embodiment focuses on differences from other embodiments. In particular, systems or the embodiments of the systems are described relatively simple, since they are basically similar to the embodiments of the methods. Reference may be made to parts of the description of the embodiments of the methods for relevant parts. The systems and the embodiments of the systems described above are only illustrative, and units described as separate components may or may not be physically separated, and the components shown as units may or may not be physical units, that is, they may be located in one place or distributed on multiple network units. Some or all modules may be selected according to actual needs to achieve the object of the solutions of the embodiments. Those skilled in the art can understand and implement without creative efforts.

Professionals can further realize that units and algorithm steps of the examples described in conjunction with the embodiments disclosed in the specification can be implemented by electronic hardware, computer software, or a combination of the two. In order to clearly illustrate the interchangeability of hardware and software, components and steps of the examples have been generally described in terms of functions in the above description. Whether the functions are executed by hardware or software depends on specific applications and design constraints of the technical solutions. Professional technicians may use different methods to implement the described functions for each specific application, and such implementation should not be considered beyond the scope of the present disclosure.

For the above description of the disclosed embodiments, features described in the embodiments of the description may be interchanged or combined, so that those skilled in the art can implement or use the present disclosure. Various modifications to the embodiments are apparent to those skilled in the art. General principles defined herein may be implemented in other embodiments without departing from spirits or scopes of the present disclosure. Therefore, the present disclosure is not limited to the embodiments shown herein, but has the widest scope in accordance to the principles and novel features disclosed herein.

The invention claimed is:

1. A single-stage multi-path DC access converter, comprising:
   an AC-side conversion circuit;
   at least two DC-side conversion circuits; and
   transformers corresponding to the at least two DC-side conversion circuits, wherein
   AC sides of the at least two DC-side conversion circuits are respectively connected to primary windings of the corresponding transformers;
   secondary windings of the transformers are connected in parallel to a first side of the AC-side conversion circuit;
   each of the at least two DC-side conversion circuits is configured to invert DC power received by the DC-side conversion circuit, or to rectify AC power received by the DC-side conversion circuit; and
   the AC-side conversion circuit is configured to perform AC frequency conversion;
   wherein the secondary windings are connected to the first side of the AC-side conversion circuit through parallel common coupling points; and an equivalent impedance of a side of the common coupling points before being connected in parallel is greater than an equivalent impedance of a side of the common coupling points after being connected in parallel.

2. The single-stage multi-path DC access converter according to claim 1, wherein an equivalent leakage inductance of the side of the common coupling points before being connected in parallel is greater than an equivalent leakage inductance of the side of the common coupling points after being connected in parallel.

3. The single-stage multi-path DC access converter according to claim 2, wherein the equivalent leakage inductance of the side of the common coupling points before being connected in parallel comprises leakage inductances of the transformers, or leakage inductances of the transformers and inductances integrated with the transformers.

4. The single-stage multi-path DC access converter according to claim 1, further comprising: impedance elements, which are respectively arranged between the AC sides of the at least two DC-side conversion circuits and the primary windings; and/or, between the common coupling points and the secondary windings.

5. The single-stage multi-path DC access converter according to claim 4, wherein the impedance elements comprise inductors, or, inductors and capacitors.

6. The single-stage multi-path DC access converter according to claim 4, wherein there are preset relationships between impedances of the impedance elements and efficiency and magnitude of transmission power of the single-stage multi-path DC access converter.

7. The single-stage multi-path DC access converter according to claim 1, wherein the transformers are single-phase transformers or three-phase transformers.

8. The single-stage multi-path DC access converter according to claim 7, wherein
a dotted terminal of the primary winding of each phase of the three-phase transformers is configured to connect to a corresponding phase on the AC side of a corresponding DC-side conversion circuit, and the other terminal of the primary winding is connected to a reference ground; and
two terminals of the secondary winding of each phase of the three-phase transformers are connected to a corresponding phase on the first side of the AC-side conversion circuit, and center taps of the secondary windings are connected with each other.

9. The single-stage multi-path DC access converter according to claim 1, wherein
in a case that the transformers are single-phase transformers, the at least two DC-side conversion circuits are half bridge circuits or full bridge circuits;
in a case that the transformers are three-phase transformers, the at least two DC-side conversion circuits are three-phase bridge circuits.

10. The single-stage multi-path DC access converter according to claim 1, wherein the AC-side conversion circuit is a cyclo conversion circuit or a matrix conversion circuit.

11. The single-stage multi-path DC access converter according to claim 10, wherein in a case that the transformers are single-phase transformers:
the AC-side conversion circuit is a half bridge conversion circuit, and a switch bridge arm and a capacitor bridge arm of the AC-side conversion circuit are connected in parallel between two terminals of a second side of the AC-side conversion circuit; the switch bridge arm comprises two bidirectional switches configured as upper and lower half bridge arms, and the capacitor bridge arm comprises two capacitor modules connected in series and with a same capacitance; and a midpoint of the switch bridge arm and a midpoint of the capacitor bridge arm are configured as two terminals of the first side of the AC-side conversion circuit;
the AC-side conversion circuit is a full bridge conversion circuit, and two switch bridge arms of the AC-side conversion circuit are connected in parallel between two terminals of a second side of the AC-side conversion circuit; and midpoints of the two switch bridge arms are configured as two terminals of the first side of the AC-side conversion circuit; or,
the AC-side conversion circuit is a three-phase bridge conversion circuit, and three switch bridge arms of the AC-side conversion circuit are connected in parallel between two terminals of the first side of the AC-side conversion circuit; and midpoints of the three switch bridge arms are configured as terminals of a second side of the AC-side conversion circuit.

12. The single-stage multi-path DC access converter according to claim 10, wherein in a case that the transformers are three-phase transformers, the AC-side conversion circuit comprises three conversion circuits;
two sides of each of the conversion circuits are configured as a corresponding phase on two sides of the AC-side conversion circuit.

13. The single-stage multi-path DC access converter according to claim 12, wherein each of the conversion circuits comprises a rectifier bridge and a half bridge circuit;
an AC side of the rectifier bridge is configured as a corresponding phase on the first side of the AC-side conversion circuit, a DC side of the rectifier bridge is connected to two terminals of the half bridge circuit, and a midpoint of the half bridge circuit is configured as the corresponding phase on a second side of the AC-side conversion circuit.

14. The single-stage multi-path DC access converter according to claim 1, further comprising: an AC-side filter circuit arranged on a second side of the AC-side conversion circuit; and/or,
DC-side filter circuits respectively arranged on DC sides of the at least two DC-side conversion circuits.

15. A control method for a single-stage multi-path DC access converter, applied to the single-stage multi-path DC access converter according to claim 1, wherein the control method comprises:
obtaining electrical parameters on two sides of the single-stage multi-path DC access converter and determining a power transmission direction required by the single-stage multi-path DC access converter;
determining a switching frequency and internal and external phase shift angles of the single-stage multi-path DC access converter, based on the electrical parameters and the power transmission direction; and
generating, based on the switching frequency and the internal and external phase shift angles, control signals for switches of the single-stage multi-path DC access converter and outputting the control signals, to realize phase shift control for the single-stage multi-path DC access converter.

16. The control method for a single-stage multi-path DC access converter according to claim 15, wherein the switching frequency is a frequency at which primary impedances of the transformers in the single-stage multi-path DC access converter are inductive.

17. The control method for a single-stage multi-path DC access converter according to claim 16, wherein the internal and external phase shift angles comprise: internal phase shift angles and external phase shift angles of the at least two DC-side conversion circuits in the single-stage multi-path DC access converter; wherein
the external phase shift angles are determined based on the power transmission direction; and
the internal phase shift angles and the external phase shift angles are independent of each other.

18. The control method for a single-stage multi-path DC access converter according to claim 15, wherein the internal and external phase shift angles comprise: internal phase shift angles and external phase shift angles of the at least two DC-side conversion circuits in the single-stage multi-path DC access converter; wherein
the external phase shift angles are determined based on the power transmission direction; and the internal phase shift angles and the external phase shift angles are independent of each other.

* * * * *